United States Patent
Yun et al.

(10) Patent No.: US 10,914,108 B2
(45) Date of Patent: Feb. 9, 2021

(54) OPPOSED TYPE SLIDING DOOR DEVICE OF VEHICLE USING PLANETARY GEAR REDUCER

(71) Applicants: Hyundai Motor Company, Seoul (KR); Kia Motors Corporation, Seoul (KR)

(72) Inventors: Hyung-In Yun, Seoul (KR); Jae-Hong Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 218 days.

(21) Appl. No.: 16/189,561

(22) Filed: Nov. 13, 2018

(65) Prior Publication Data

US 2020/0102777 A1 Apr. 2, 2020

(30) Foreign Application Priority Data

Oct. 1, 2018 (KR) .................... 10-2018-0116702

(51) Int. Cl.
*E05D 15/10* (2006.01)
*B60J 5/06* (2006.01)
*B60J 5/04* (2006.01)

(52) U.S. Cl.
CPC .......... *E05D 15/101* (2013.01); *B60J 5/0477* (2013.01); *B60J 5/06* (2013.01); *E05Y 2900/531* (2013.01)

(58) Field of Classification Search
None
See application file for complete search history.

(56) References Cited

U.S. PATENT DOCUMENTS

| | | | | |
|---|---|---|---|---|
| 3,415,015 A | * | 12/1968 | Rolfe, Jr. ............. | B61D 19/009 49/220 |
| 4,268,996 A | * | 5/1981 | Allen ..................... | B60J 5/06 49/212 |
| 7,810,282 B2 | * | 10/2010 | Oxley ................... | E05F 15/638 49/362 |
| 9,499,031 B2 | | 11/2016 | Choi et al. | |
| 9,587,724 B2 | * | 3/2017 | Choi ...................... | E05F 11/54 |
| 10,384,519 B1 | * | 8/2019 | Brown ................... | E05F 15/649 |
| 10,633,908 B1 | * | 4/2020 | Loeb ..................... | E05D 15/101 |
| 2006/0175867 A1 | * | 8/2006 | Heuel ..................... | E05D 15/58 296/155 |

(Continued)

FOREIGN PATENT DOCUMENTS

KR    101542980 B1    8/2015

*Primary Examiner* — Marcus Menezes
(74) *Attorney, Agent, or Firm* — Slater Matsil, LLP

(57) ABSTRACT

An opposed type sliding door device includes a center rail mounted on a center of a door in a longitudinal direction of the door. A center roller is mounted on a vehicle body and a lower rail is mounted on a lower portion of the vehicle body. A lower roller is mounted on the door and moves along the lower rail to pivot the door toward the outside of the vehicle. The lower roller includes a pinion gear which engages in a rack gear mounted on a lower portion of the lower rail, a planetary gear reducer coupled to an upper portion of the pinion gear, a swing bracket moving the door toward the outside with rotation of the pinion gear, and a mounting bracket having one end coupled to the door and another end coupled to the swing bracket.

20 Claims, 5 Drawing Sheets

(56) References Cited

U.S. PATENT DOCUMENTS

| | | | |
|---|---|---|---|
| 2009/0051194 A1* | 2/2009 | Elliott | B60J 5/0479 296/146.11 |
| 2009/0072583 A1* | 3/2009 | Elliott | B60J 5/0479 296/155 |
| 2012/0031003 A1* | 2/2012 | Boettcher | B60J 5/06 49/154 |
| 2012/0272578 A1* | 11/2012 | Ellinghaus | E05D 15/101 49/358 |
| 2013/0152477 A1* | 6/2013 | Choi | E05F 11/48 49/350 |
| 2013/0269259 A1* | 10/2013 | Hendren | B60J 5/06 49/257 |
| 2014/0173989 A1* | 6/2014 | Choi | E05F 15/649 49/350 |
| 2015/0291014 A1* | 10/2015 | Choi | B60J 5/06 49/449 |
| 2015/0291015 A1* | 10/2015 | Choi | E05D 15/101 49/150 |
| 2016/0114659 A1* | 4/2016 | Maruyama | E05D 15/0608 49/164 |
| 2016/0129769 A1* | 5/2016 | Choi | E05C 3/124 49/120 |

* cited by examiner

OPPOSED TYPE SLIDING DOOR DEVICE OF VEHICLE USING PLANETARY GEAR REDUCER

CROSS-REFERENCE TO RELATED APPLICATIONS

This application claims priority to Korean Patent Application No. 10-2018-0116702, filed in the Korean Intellectual Property Office on Oct. 1, 2018, which application is hereby incorporated herein by reference.

TECHNICAL FIELD

The present invention relates to an opposed type sliding door device using a planetary gear reducer.

BACKGROUND

Generally, a vehicle is provided with a vehicle room of a predetermined size on which a driver or an accompanying passenger can ride, and a vehicle room opening and closing door is provided in a vehicle body to open and close the vehicle room.

The vehicle room opening and closing door includes a front door installed forward in the longitudinal direction of the vehicle in the case of a passenger car and a rear door installed rearward in the longitudinal direction of the vehicle. The front door and the rear door are generally installed in the vehicle body to be rotatable via a hinge.

Meanwhile, in the case of a van in which many people can ride, the vehicle room opening and closing door is configured to open and close the vehicle room while sliding forward and rearward in the longitudinal direction of the vehicle.

In recent years, there has been a need to completely open a door opening to make it easier to allow a disabled person to ride, load a baggage, and the like, thereby requiring a sliding door to be installed not only in the van but also in the passenger car.

In this regard, Korean Patent No. 10-1542980 and corresponding U.S. Pat. No. 9,499,031 (rear door device of vehicle) in the related art relates to a rear door device which moves forward and backward in the longitudinal direction of the vehicle to open and close the door openings of the vehicle body and discloses a rear door device that opens and closes a sliding door by utilizing a straight upper rail and a curved lower rail, and a link structure.

However, the related art has a problem that the related art cannot be easily applied to a vehicle in which a rail occupies an excessively large space inside the vehicle body due to application of the curved lower rail, which requires a large battery mounting space inside the vehicle body such as an electric vehicle.

Since a structure of a roller is constituted by multiple links and becomes thus complicated, and as a result, a slight trouble frequently occurs and cost of a product increases.

SUMMARY

Embodiments of the present invention relate to an opposed type sliding door device using a planetary gear reducer that allows a door to slide smoothly in a longitudinal direction of a vehicle. Particular embodiments relate to an opposed type sliding door device that secures an internal space of a vehicle body and simplifies a structure by using a straight lower rail and a bent swing bracket.

Embodiments of the present invention can provide an opposed type sliding door device which secures an internal space of a vehicle body and strengthens collision performance by using a straight line shape lower rail in a sliding door device in the related art and simplifies a structure by using a planetary gear reducer and a swing bracket.

An exemplary embodiment of the present invention provides an opposed type sliding door device using a planetary gear reducer. This device includes a center rail mounted on a center of a door in a longitudinal direction of the door. A center roller is mounted on a vehicle body so that the center rail moves while supporting the center rail. A lower rail is mounted on a lower portion of the vehicle body in a straight line in the longitudinal direction of the vehicle body. A lower roller is mounted on the door and moves along the lower rail to pivot the door toward the outside. The lower roller further includes a pinion gear which engages in a rack gear mounted on a lower portion of the lower rail, a planetary gear reducer coupled to an upper portion of the pinion gear to reduce a rotational amount of the pinion gear, and a swing bracket moving the door toward the outside with rotation of the pinion gear.

The lower roller may further include a mounting bracket of which one end is coupled to the vehicle body and the other end is coupled to the swing bracket to fix the lower roller to a door.

One end of the swing bracket may be rotatably coupled to the mounting bracket and the other end of the swing bracket may be coupled to the upper portion of the planetary gear reducer.

A center of the swing bracket is bent at a predetermined angle to convert a linear motion of the pinion gear into a rotational motion of the door.

The door may include a front door and a rear door, and two or more center rails, center rollers, lower rails, and lower rollers are mounted, respectively to open the front door and the rear door to be opposed to each other.

The lower rail may further include a support structure that is capable of supporting the lower roller and allowing the lower roller to move while being fit in the lower rail.

The lower roller may further include a coupling block positioned on the upper portion of the pinion gear and moving along the lower rail while being fit in the support structure.

The support structure may be an LM (linear motion) rail and the coupling block may be an LM block corresponding to the LM rail.

The mounting bracket may further include a fixation unit mounted on the door, a connection unit of which one end is coupled to the fixation unit and the other end is coupled to the swing bracket, and a support unit bent to be spaced apart from the connection unit from the fixation unit to support the swing bracket.

The mounting bracket has an angle adjustment hole for adjusting a rotational angle of the swing bracket formed on the upper portion to restrict the door to rotate at a predetermined angle or more.

According to an exemplary embodiment of the present invention, collision performance can be strengthened and an internal space can be utilized by using a straight lower rail.

According to the exemplary embodiment of the present invention, a center rail is not mounted on a vehicle body, but mounted on a door, and as a result, the internal space can be utilized and the center rail is not exposed.

According to the exemplary embodiment of the present invention, a rail is not included with an upper portion of the vehicle body that is not a box-type vehicle or a van but rather a general car.

According to the exemplary embodiment of the present invention, as a structure is simplified by using a curved swing bracket, manufacturing is easy and cost is reduced.

DETAILED DESCRIPTION OF ILLUSTRATIVE EMBODIMENTS

Figure 1:
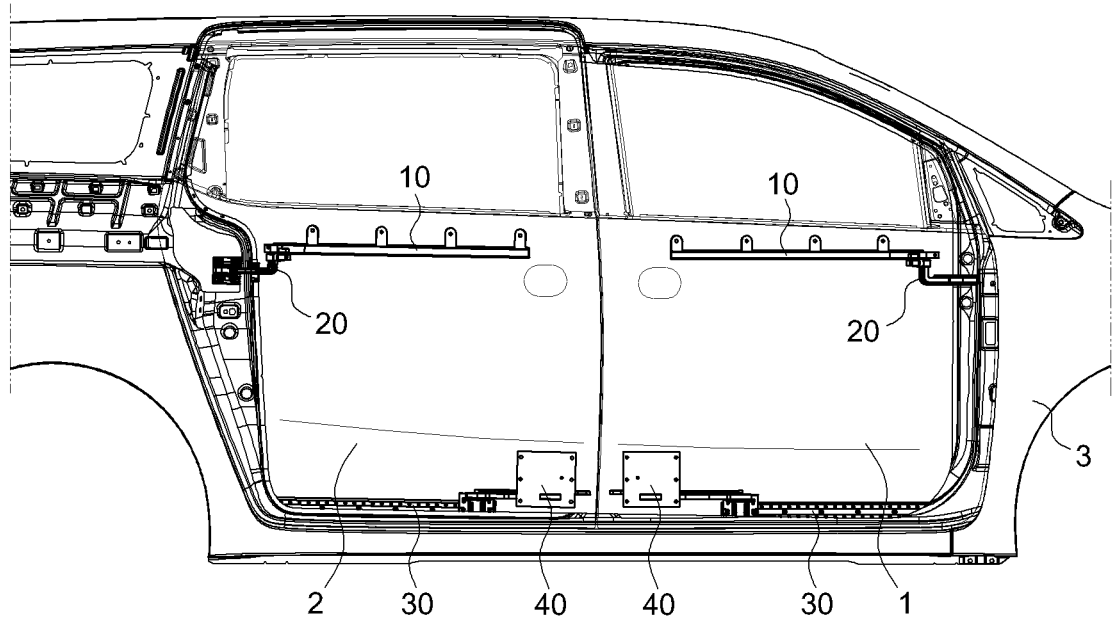
FIG. 1 is a front view of a vehicle equipped with an opposed type sliding door device using a planetary gear reducer according to the present invention.

Hereinafter, the present invention will be described in detail with reference to contents disclosed in the accompanying drawings. However, the present invention is not restricted or limited by exemplary embodiments. Like reference numerals presented in each drawing refer to elements that perform substantially the same functions.

Figure 2:
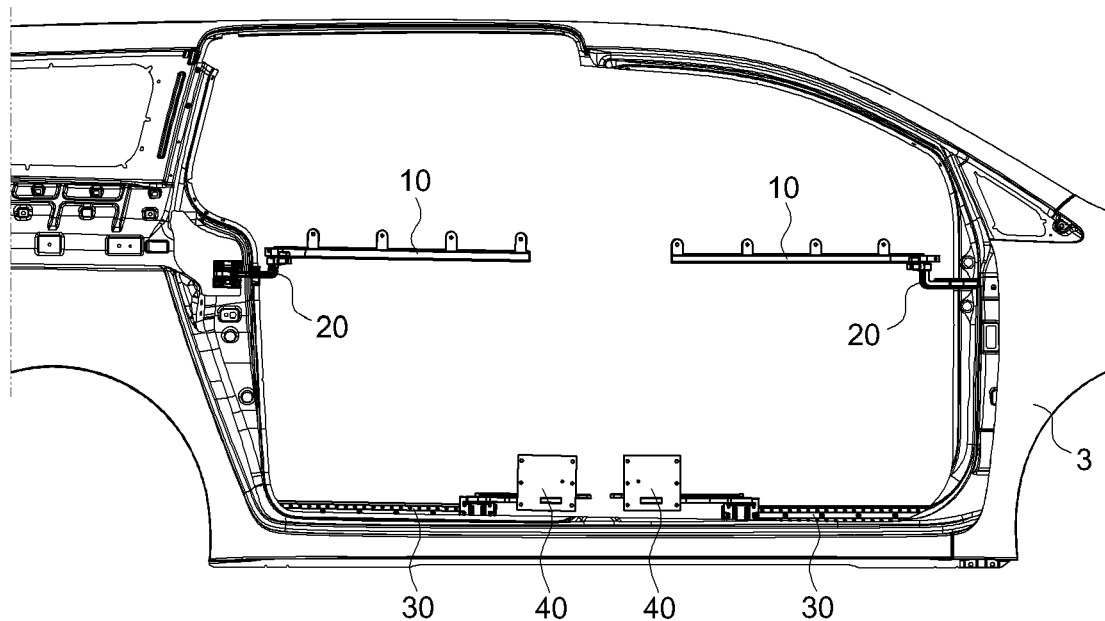
FIG. 2 is a front view of a vehicle body equipped with an opposed type sliding door device using a planetary gear reducer according to the present invention.

FIG. 1 is a front view of a vehicle equipped with an opposed type sliding door device using a planetary gear reducer according to the present invention and FIG. 2 is a front view of a vehicle body 3 equipped with an opposed type sliding door device using a planetary gear reducer 43 according to the present invention.

Referring to FIGS. 1 and 2, an opposed type sliding door device using a planetary gear reducer according to the present invention may include a center rail 10, a center roller 20, a lower rail 30, and a lower roller 40.

The opposed type sliding door device using the planetary gear reducer according to the present invention may be applied to various types of vehicles as well as a box type or a bongo vehicle by eliminating a rail which is located on the vehicle body or a door of a sliding door in the related art.

The center rail 10 may be mounted on centers of doors 1 and 2 in longitudinal directions of the doors 1 and 2.

The center roller 20 is mounted on the vehicle body 3 to correspond to the center rail 10, and as a result, the center rail 10 may move along the center roller 20 when a user attempts to open the doors 1 and 2 with a hand or the doors 1 and 2 are automatically opened by a mechanical mechanism.

The lower rail 30 may be mounted on a straight line in the longitudinal direction of the vehicle body 3 below the vehicle body 3.

The lower roller 40 is mounted on the doors 1 and 2 to correspond to the lower rail 30, and as a result, the lower roller 40 may move along the lower rail 30 and may pivot the doors 1 and 2 toward the outside when the user attempts to open the doors 1 and 2 with the hand or the doors 1 and 2 are automatically opened by the mechanical mechanism similarly to the center roller 20.

The doors 1 and 2 may include a front door 1 and a rear door 2 and two or more center rails 10, center rollers 20, lower rails 30, and lower rollers 40 may be mounted so as to open/close the front door 1 and the rear door 2, respectively.

A pair of center rails 10 mounted on each of the front door 1 and the rear door 2 may be mounted symmetrically with each other and the lower rails 30 are also similarly mounted. Further, a pair of center rollers 20 mounted on the vehicle body 3 may be mounted symmetrically with each other and the lower rails 30 are also similarly mounted.

A pair of center rails 10, center rollers 20, lower rails 30, and lower rollers 40 open and close the front door 1 and the remaining pair opens and closes the rear door 2, and as a result, the front door 1 and the rear door 2 may be opened to be opposed to each other in the opposed type sliding door device using the planetary gear reducer according to the present invention.

Figure 3:
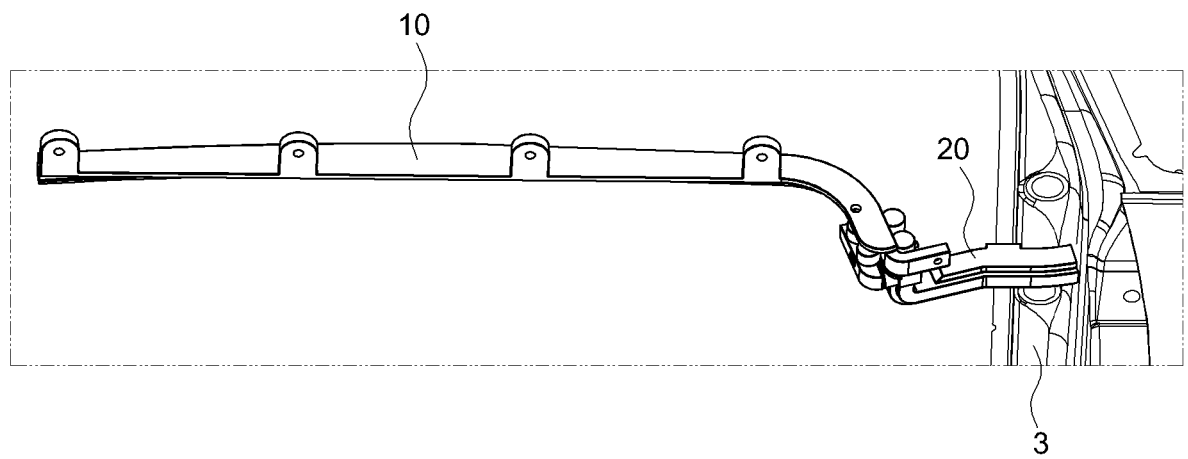
FIG. 3 is a perspective view of a center rail and a center roller according to the present invention.

FIG. 3 is a perspective view of a center rail 10 and a center roller 20 according to the present invention.

Referring to FIG. 3, the center roller 20 is mounted on the vehicle body 3 to support the center rail 10 and allow the center rail 10 to move via the center roller 20.

Unlike the case where the center rail is mounted on the vehicle body in the related art, the center rail 10 of the present invention is mounted on the doors 1 and 2, and as a result, the center rail 10 may not be exposed even though the doors 1 and 2 are closed.

The center rail 10 in the related art has a problem in that in the case of the front door 1, there is no mounting space in the vehicle body 3, and as a result, a sliding door may not be installed in the front door 1.

However, since the center rail 10 of the present invention is mounted on the doors 1 and 2, the sliding door may also be installed even in the rear door 2 and the front door 1, and as a result, opposed type sliding doors 1 and 2 may be implemented, which may open the front door 1 and the rear door 2 in opposing directions, respectively.

Figure 4:
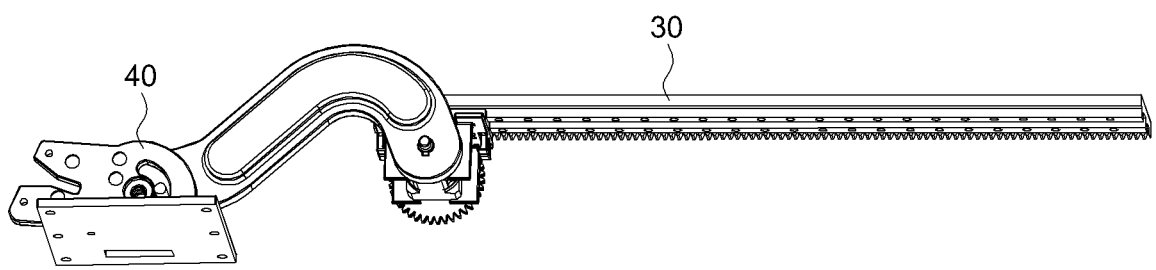
FIG. 4 is a perspective view of a lower rail and a lower roller according to the present invention.

FIG. 4 is a perspective view of a lower rail 30 and a lower roller 40 according to the present invention.

Referring to FIG. 4, the lower rail 30 is mounted on the straight line in the longitudinal direction of the vehicle body 3 below the vehicle body 3 and the lower roller 40 is mounted on the doors 1 and 2 and moves along the lower rail 30 and may pivot the doors 1 and 2 toward the outside.

Figure 5:
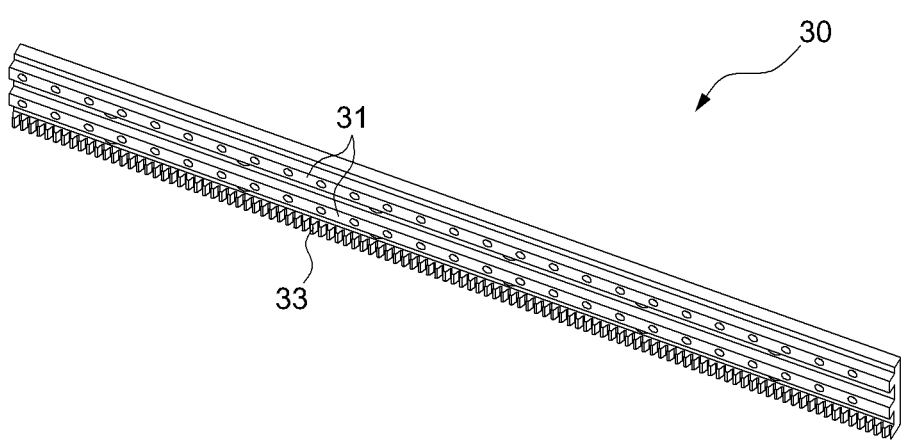
FIG. 5 is a perspective view of a lower rail according to the present invention.

FIG. 5 is a perspective view of a lower rail 30 according to the present invention.

Referring to FIG. 5, the lower rail 30 may include a support structure 31 and a rack gear 33.

Multiple grooves or a single groove extends to the lower rail 30 on a plane of the support structure 31, which contacts the lower roller 40, and as a result, the support structure 31 may support the lower roller 40 and allow the lower roller 40 to move while being fit into the lower rail 30. For example, the support structure 31 may be an LM (linear motion) rail.

The rack gear 33 is mounted on a lower portion of the lower rail 30 to rotate a pinion gear 41 mounted on the lower roller 40 with movement of the doors 1 and 2.

Figure 6:
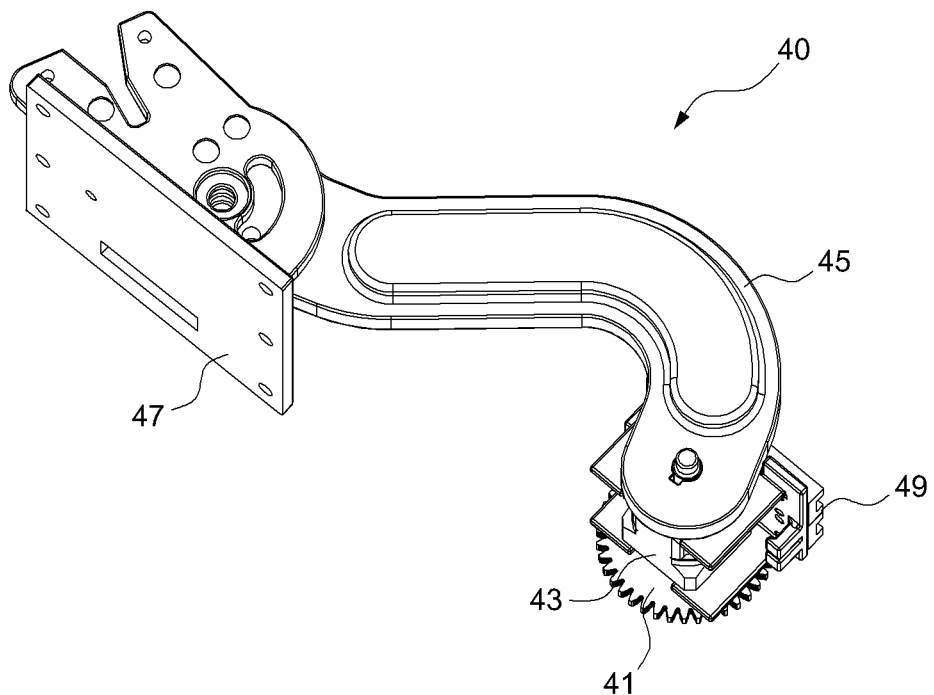
FIG. 6 is a perspective view of a lower roller according to the present invention.

FIG. 6 is a perspective view of a lower roller 40 according to the present invention.

Referring to FIG. 6, the lower roller 40 may include a mounting bracket 47, a pinion gear 41, a planetary gear reducer 43, a swing bracket 45, and a coupling block 49.

The mounting bracket 47 is mounted on the doors 1 and 2 to fix the lower roller 40 to the doors 1 and 2.

The pinion gear 41 may engage in the rack gear 33 mounted on the lower portion of the lower rail 30 and rotate with movement of the doors 1 and 2.

The planetary gear reducer 43 is coupled to an upper portion of the pinion gear 41 to reduce a rotational amount of the pinion gear 41.

The swing bracket 45 may move the doors 1 and 2 toward the outside with rotation of the pinion gear 41.

The coupling block 49 may be positioned above the pinion gear 41 and may move along the lower rail 30 while being fit in the support structure 31.

When the support structure 31 is the LM rail, the coupling block 49 may be an LM block corresponding thereto.

Figure 7:
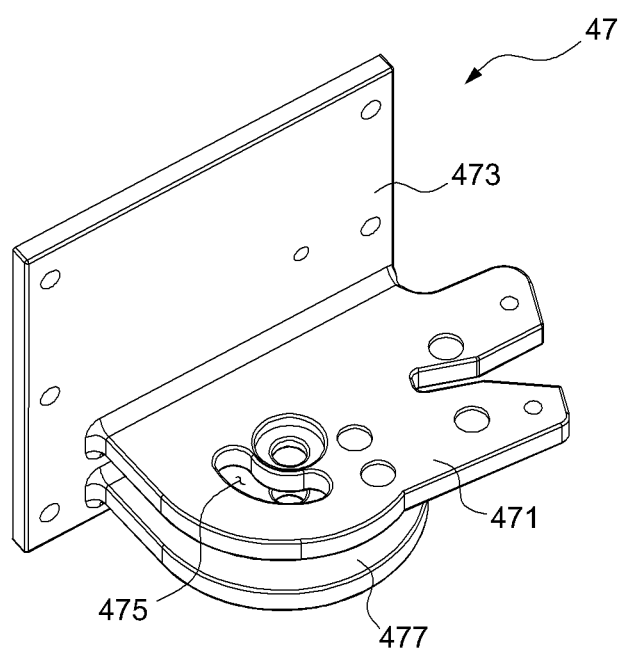
FIG. 7 is a perspective view of a mounting bracket according to the present invention.

FIG. 7 is a perspective view of a mounting bracket 47 according to the present invention.

Referring to FIG. 7, the mounting bracket 47 may include a fixation unit 473, a connection unit 471, a support unit 477, and an angle adjustment hole 475.

The fixation unit 473 may be formed by a flat plate and mounted on the doors 1 and 2 in the same method as bolting.

The connection unit 471 may have one end connected to the fixation unit 473 and the other end connected to the swing bracket 45, and may be bent in a '⌐' shape from the fixation unit 473.

The support unit 477 is bent to be spaced apart from the connection unit 471 from the fixation unit 473 to support the swing bracket 45 from the bottom.

The angle adjustment hole 475 may be a hole having a shape bent at a predetermined angle in the connection unit 471 in order to adjust a rotational angle of the swing bracket 45. A shape of the angle adjustment hole 475 may be changed according to the shape of the swing bracket 45 and the rotational angle of the swing bracket 45.

In the case of the rotational angle of the swing bracket 45, an angle at which the doors 1 and 2 rotate toward the outside may be previously calculated and determined so as to avoid interference with the vehicle body 3 when the doors 1 and 2 are opened.

Figure 8:
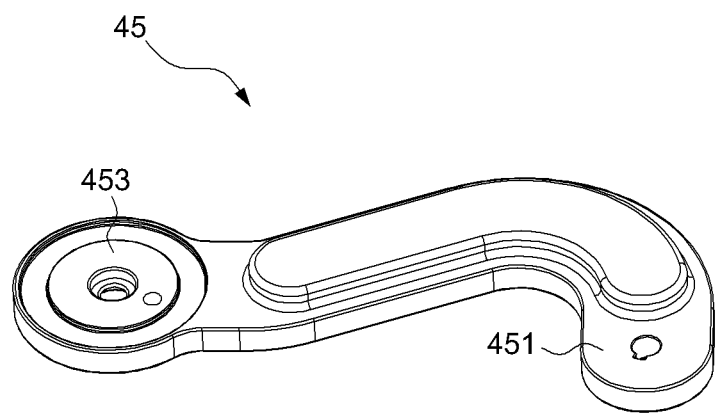
FIG. 8 is a perspective view of a swing bracket according to the present invention.

FIG. 8 is a perspective view of a swing bracket 45 according to the present invention.

Referring to FIG. 8, a coupling unit 453 of the mounting bracket 47 formed on one end may be rotatably coupled to the mounting bracket 47 and a reducer coupling unit 451 formed on the other end may be coupled to the planetary gear reducer 43.

A center of the swing bracket 45 is bent at a predetermined angle to convert a linear motion of the pinion gear 41 into a rotational motion of the doors 1 and 2 without a separate link.

Figure 9:
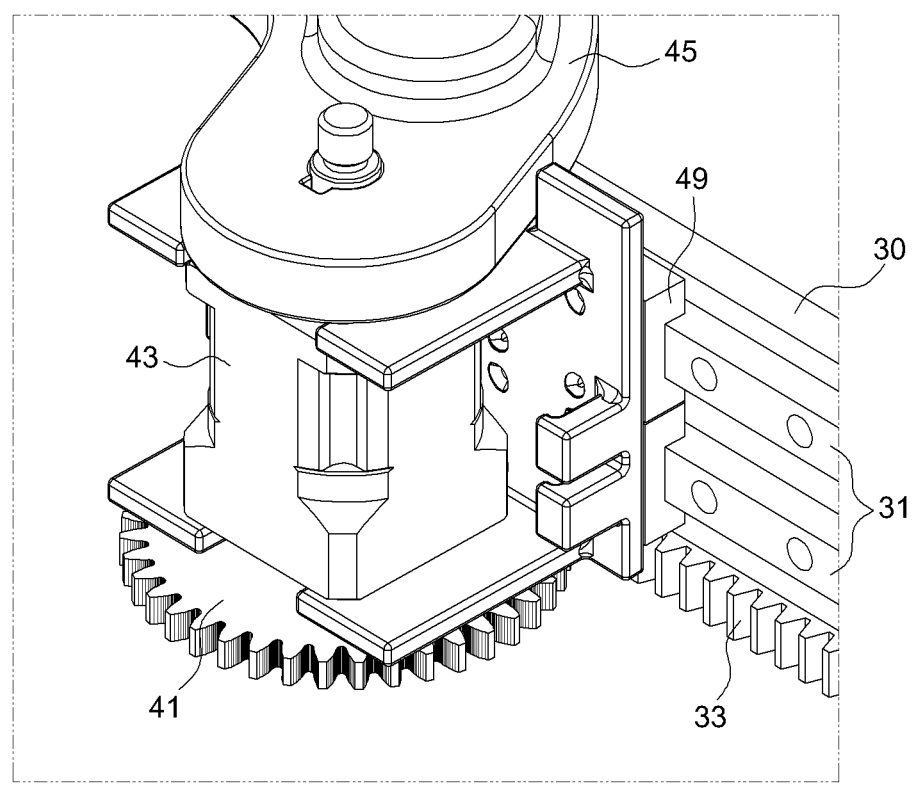
FIG. 9 is a perspective view of a planetary gear reducer according to the present invention.

FIG. 9 is a perspective view of a planetary gear reducer 43 according to the present invention.

Referring to FIG. 9, the planetary gear reducer 43 is mounted on the upper portion of the pinion gear 41 to reduce the rotational amount of the pinion gear 41 and transfer the reduced rotational amount to the swing bracket 45.

The swing bracket 45 may be set to rotate once while the pinion gear 41 rotates 10 times.

Figure 10:
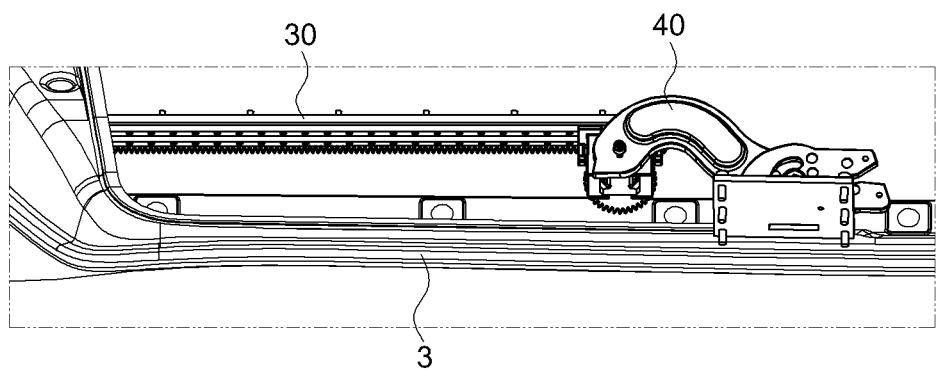
FIG. 10 is a perspective view of an opposed type sliding door device using a planetary gear reducer according to the present invention when a door is closed.
Figure 11:
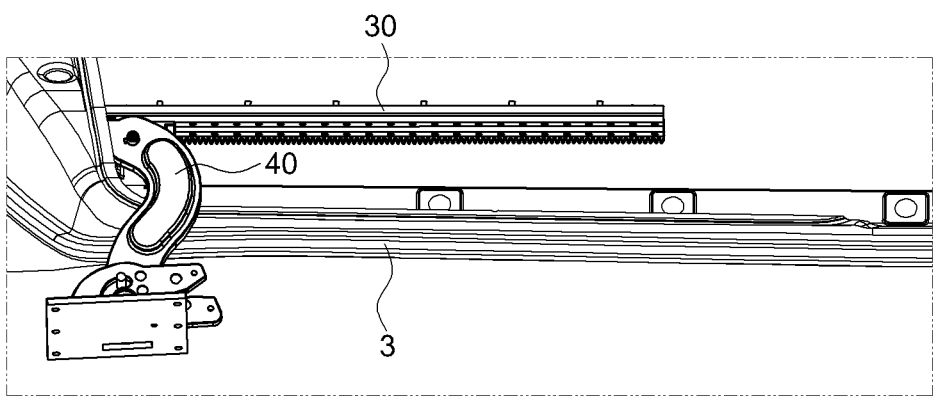
FIG. 11 is a perspective view of the opposed type sliding door device using a planetary gear reducer according to the present invention when the door is opened.

FIG. 10 is a perspective view of an opposed type sliding door device 1 or 2 using a planetary gear reducer according to the present invention when a door 1 or 2 is closed and FIG. 11 is a perspective view of the opposed type sliding door 1 or 2 device using a planetary gear reducer according to the present invention when the door 1 or 2 is opened.

Referring to FIGS. 10 and 11, the lower rail 30 is mounted on the vehicle body 3 in a straight line structure and when the doors 1 and 2 are opened, the doors 1 and 2 do not intrude into the vehicle body 3, and as a result, it is possible to increase the utilization of an inner space as compared with the case where the lower rail 30 is mounted in a curved line structure.

Accordingly, the lower rail 30 may be utilized even in a special vehicle requiring a lot of battery mounting spaces therein like the general vehicle and an electric vehicle.

When there is an impact or collision on a lateral surface of the vehicle body 3, collision performance may be enhanced as compared with the case where the lower rail 30 is the curved line structure.

Referring to FIGS. 10 and 11, when the doors 1 and 2 are closed, the mounting bracket 47 mounted on the doors 1 and 2 approaches the vehicle body 3 and may move toward the outside by the swing bracket 45 when the doors 1 and 2 are opened. This means that the doors 1 and 2 rotate and move toward the outside.

The opposed type sliding door 1 and 2 devices of the present invention in which the collision performance is enhanced by using the straight rail structure may be applied even to a B pillarless vehicle body without a B pillar.

Objects and effects of the present invention may be naturally appreciated or clearer by the following description and the objects and effects of the present invention are not limited only by the following disclosure. Further, in describing the present invention, a detailed description of known technologies associated with the present invention may be omitted to avoid unnecessarily obscuring the subject matter of the present invention.

What is claimed is:

1. An opposed type sliding door device, the device comprising:
   a center rail mounted on a center of a door in a longitudinal direction of the door;
   a center roller mounted on a vehicle body and being capable of moving;
   a lower rail mounted on a lower portion of the vehicle body in a straight line in the longitudinal direction of the vehicle body; and
   a lower roller mounted on the door and moving along the lower rail to pivot the door toward the outside of the vehicle, wherein the lower roller includes:
     a pinion gear which engages in a rack gear mounted on a lower portion of the lower rail;
     a planetary gear reducer coupled to an upper portion of the pinion gear to reduce a rotational amount of the pinion gear;
     a swing bracket moving the door toward the outside with rotation of the pinion gear; and
     a mounting bracket having one end coupled to the door and an other end coupled to the swing bracket to fix the lower roller to the door, wherein the mounting bracket has an angle adjustment hole for adjusting a rotational angle of the swing bracket to restrict the door to rotate at a predetermined angle.

2. The device of claim 1, wherein one end of the swing bracket is rotatably coupled to the mounting bracket and an other end of the swing bracket is coupled to the upper portion of the planetary gear reducer.

3. The device of claim 1, wherein the mounting bracket further comprises:
   a fixation unit mounted on the door;
   a connection unit having one end coupled to the fixation unit and an other end coupled to the swing bracket; and
   a support unit bent to be spaced apart from the connection unit and is bent from the fixation unit to support the swing bracket.

4. The device of claim 1, wherein a center of the swing bracket is bent at a predetermined angle to convert a linear motion of the pinion gear into a rotational motion of the door.

5. The device of claim 1, wherein the door includes a front door and a rear door and wherein a plurality of center rails, center rollers, lower rails, and lower rollers are mounted, respectively to open the front door and the rear door to be opposed to each other.

6. The device of claim 1, wherein the lower rail further includes a support structure that is capable of supporting the lower roller and allowing the lower roller to move while being fit in the lower rail.

7. The device of claim 6, wherein the lower roller further includes a coupling block positioned on the upper portion of the pinion gear and moving along the lower rail while being fit in the support structure.

8. The device of claim 7, wherein the support structure is an LM (linear motion) rail and the coupling block is an LM block corresponding to the LM rail.

9. A passenger car comprising:
   a vehicle body having a vehicle room;
   a door in the vehicle body to open and close the vehicle room;
   a center rail mounted on a center of the door in a longitudinal direction of the door;
   a center roller mounted on the vehicle body to support the center rail and allow the center rail to move via the center roller;
   a lower rail mounted on a lower portion of the vehicle body in a straight line in the longitudinal direction of the vehicle body; and
   a lower roller mounted on the door and moving along the lower rail to pivot the door toward the outside of the vehicle, wherein the lower roller includes:
      a pinion gear which engages in a rack gear mounted on a lower portion of the lower rail;
      a planetary gear reducer coupled to an upper portion of the pinion gear to reduce a rotational amount of the pinion gear;
      a swing bracket moving the door toward the outside with rotation of the pinion gear; and
      a mounting bracket having one end coupled to the door and an other end coupled to the swing bracket to fix the lower roller to the door, wherein the mounting bracket has an angle adjustment hole for adjusting a rotational angle of the swing bracket to restrict the door to rotate at a predetermined angle.

10. The passenger car of claim 9, wherein one end of the swing bracket is rotatably coupled to the mounting bracket and an other end of the swing bracket is coupled to the upper portion of the planetary gear reducer.

11. The passenger car of claim 9, wherein the mounting bracket further comprises:
    a fixation unit mounted on the door;
    a connection unit having one end coupled to the fixation unit and an other end coupled to the swing bracket; and
    a support unit bent to be spaced apart from the connection unit and is bent from the fixation unit to support the swing bracket.

12. The passenger car of claim 9, wherein a center of the swing bracket is bent at a predetermined angle to convert a linear motion of the pinion gear into a rotational motion of the door.

13. The passenger car of claim 9, wherein the door includes a front door and a rear door and wherein a plurality of center rails, center rollers, lower rails, and lower rollers are mounted, respectively to open the front door and the rear door to be opposed to each other.

14. The passenger car of claim 9, wherein the lower rail further includes a support structure that is capable of supporting the lower roller and allowing the lower roller to move while being fit in the lower rail.

15. The passenger car of claim 14, wherein the lower roller further includes a coupling block positioned on the upper portion of the pinion gear and moving along the lower rail while being fit in the support structure.

16. The passenger car of claim 15, wherein the support structure is an LM (linear motion) rail and the coupling block is an LM block corresponding to the LM rail.

17. An opposed type sliding door device, the device comprising:
    a center rail mounted on a center of a door in a longitudinal direction of the door;
    a center roller mounted on a vehicle body and being capable of moving;
    a lower rail mounted on a lower portion of the vehicle body in a straight line in the longitudinal direction of the vehicle body; and
    a lower roller mounted on the door and moving along the lower rail to pivot the door toward the outside of the vehicle, wherein the lower roller includes:
       a pinion gear which engages in a rack gear mounted on a lower portion of the lower rail;
       a planetary gear reducer coupled to an upper portion of the pinion gear to reduce a rotational amount of the pinion gear;
       a swing bracket moving the door toward the outside with rotation of the pinion gear; and
       a mounting bracket having one end coupled to the door and an other end coupled to the swing bracket to fix the lower roller to the door;
    wherein the mounting bracket has an angle adjustment hole for adjusting a rotational angle of the swing bracket to restrict the door to rotate at a predetermined angle;
    wherein one end of the swing bracket is rotatably coupled to the mounting bracket and an other end of the swing bracket is coupled to the upper portion of the planetary gear reducer; and
    wherein the mounting bracket further comprises:
       a fixation unit mounted on the door;
       a connection unit having one end coupled to the fixation unit and an other end coupled to the swing bracket; and
       a support unit bent to be spaced apart from the connection unit and is bent from the fixation unit to support the swing bracket.

18. The device of claim 17, wherein a center of the swing bracket is bent at a predetermined angle to convert a linear motion of the pinion gear into a rotational motion of the door.

19. The device of claim 17, wherein the door includes a front door and a rear door and wherein a plurality of center rails, center rollers, lower rails, and lower rollers are mounted, respectively to open the front door and the rear door to be opposed to each other.

20. The device of claim 17, wherein the lower rail further includes a support structure that is capable of supporting the lower roller and allowing the lower roller to move while being fit in the lower rail.

* * * * *